(12) United States Patent
Lu (10) Patent No.: US 6,527,394 B1
(45) Date of Patent: Mar. 4, 2003

(54) OBJECTIVE ARRANGEMENTS

(75) Inventor: Kai Chang Lu, Sutton Coldfield (GB)

(73) Assignee: International Optics Limited (GB)

( * ) Notice: Subject to any disclaimer, the term of this patent is extended or adjusted under 35 U.S.C. 154(b) by 0 days.

(21) Appl. No.: 09/431,029

(22) Filed: Oct. 27, 1999

(30) Foreign Application Priority Data

Nov. 4, 1998 (GB) .............................................. 9823998

(51) Int. Cl.⁷ .............................................. G03B 21/14
(52) U.S. Cl. .......................... 353/69; 353/101; 359/433
(58) Field of Search ........................... 353/69, 70, 101; 359/433

(56) References Cited

U.S. PATENT DOCUMENTS

| | | | | |
|---|---|---|---|---|
| 5,096,288 A | * | 3/1992 | Yano et al. | ..................... 353/69 |
| 5,302,983 A | * | 4/1994 | Sato et al. | ..................... 353/69 |
| 5,355,188 A | * | 10/1994 | Biles et al. | ..................... 353/69 |
| 5,820,240 A | * | 10/1998 | Ohzawa | ........................ 353/70 |
| 6,118,501 A | * | 9/2000 | Ohzawa | ......................... 349/5 |
| 6,123,425 A | * | 9/2000 | Ohzawa | ........................ 353/69 |
| 6,188,523 B1 | * | 2/2001 | Choi | ........................ 359/649 |

FOREIGN PATENT DOCUMENTS

| | | | |
|---|---|---|---|
| EP | 0115901 | * | 8/1984 |
| GB | 498419 | * | 1/1937 |

* cited by examiner

*Primary Examiner*—William Dowling
(74) *Attorney, Agent, or Firm*—Watts, Hoffmann, Fisher & Heinke Co., L.P.A.

(57) ABSTRACT

The invention relates to objective arrangements for use in projection systems such as overhead projectors. An objective arrangement 10 provides a tilted image plane. The arrangement 10 is rotationally asymmetric by virtue of the third element 16 having a principal optical axis 22 which is displaced to one side, but parallel with the principal optical axes 20 of the first and second elements 12,14. This asymmetry has been found to correct aberrations introduced by a tilted Fresnel lens used in the projection arrangement.

15 Claims, 11 Drawing Sheets

Fig.7(iii)

Fig.9(iii)

Fig.11(i) Fig.11(ii) Fig.11(iii) Fig.11(iv) Fig.11(v)

Fig.13(iii)

OBJECTIVE ARRANGEMENTS

The present invention relates to objective arrangements particularly, but not exclusively, for use in overhead and liquid crystal display (LCD) projection systems.

Figure 1:
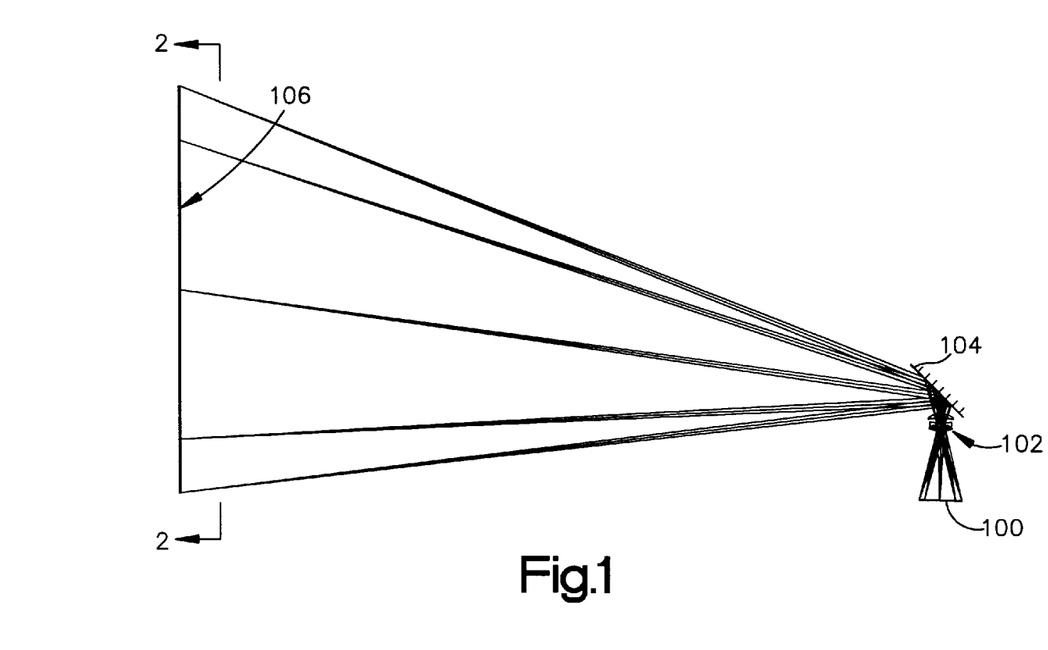
FIG. 1 is a schematic view of a prior art overhead projection arrangement.

Overhead projectors and LCD projectors are well known. In an overhead projector arrangement as shown schematically in FIG. 1, a slide 100 is laid on a horizontal light bed beneath an optical objective 102 having a substantially vertical axis. A mirror 104 above the objective reflects the image out onto a reflective screen 106, for viewing.

Figure 2:
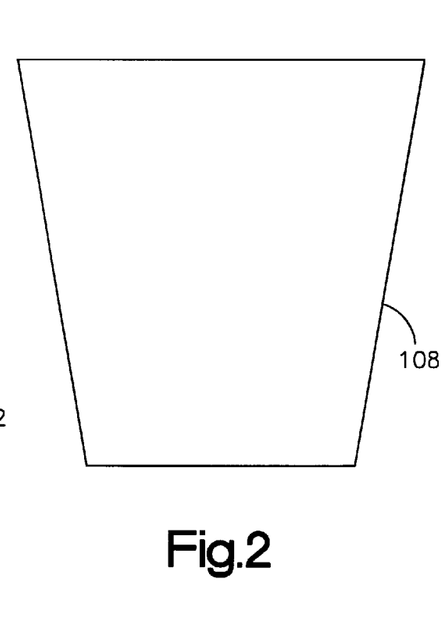
FIG. 2 is a view at A—A in FIG. 1, showing the keystone effect in the image.

In many situations, it is necessary to tilt the mirror to project the image higher up the screen, in order for it to be visible by the whole audience. When this is done, the distance over which the image is projected to the top of the screen is longer than the distance over which the image is projected to the bottom of the screen. Hence, the width of the image is greater at the top of the screen than at the bottom and consequently, an ostensibly rectangular image will appear on the screen with the distorted shape 108 shown in FIG. 2. This type of distortion is known as the keystone effect, by analogy with the shape of an architectural keystone.

Figure 3:
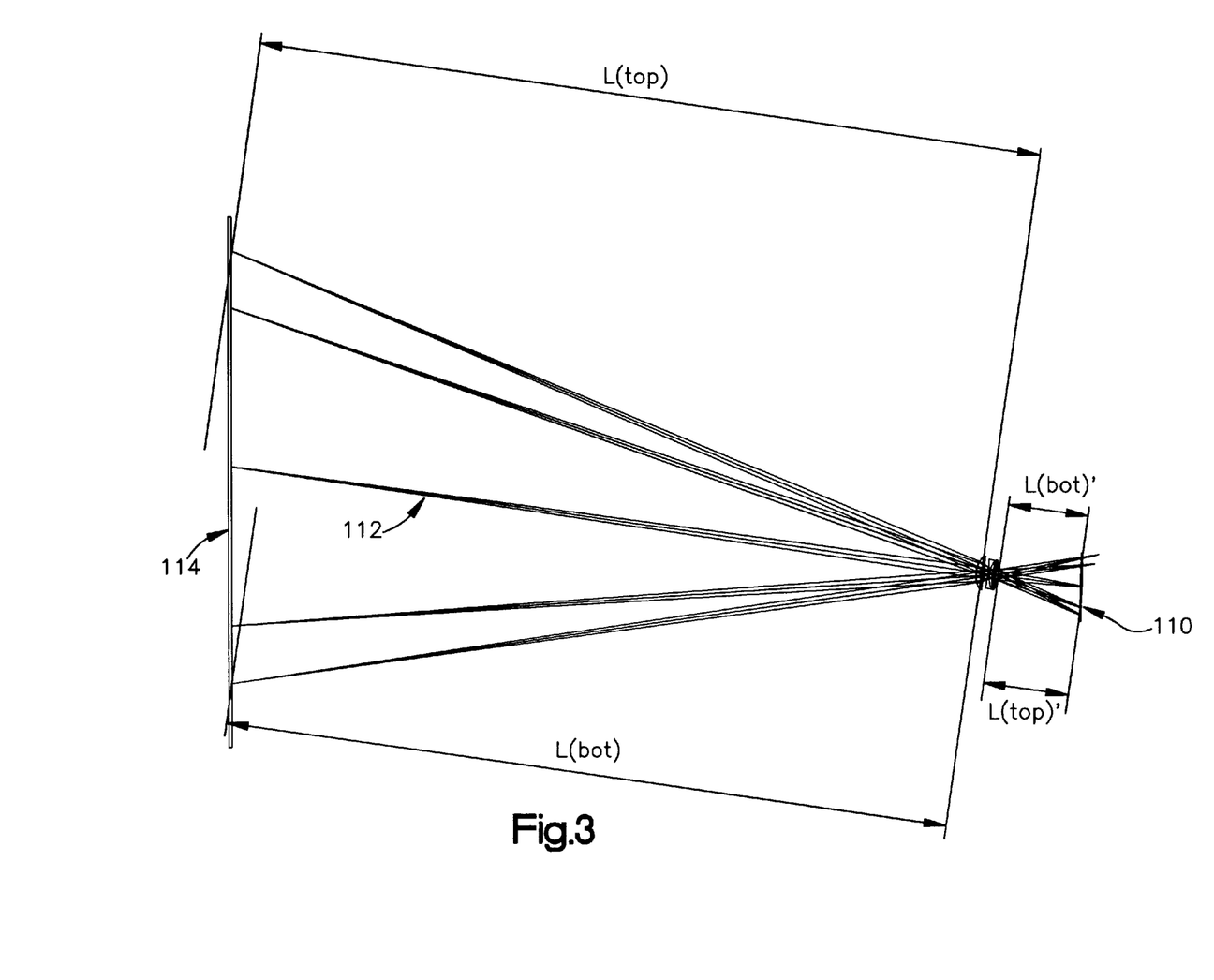
FIG. 3 shows a prior art arrangement adjusted to reduce the keystone effect.

FIG. 3 shows one possible arrangement for dealing with the keystone effect. This arrangement seeks to keep the optical magnification constant across the field. It can be seen from FIG. 3 that the image plane 110 is not perpendicular to the optical axis 112, but is parallel to the object plane 114, with the result that the keystone effect will be corrected, because the ratio L (top) to L (top)' will be equal to the ratio of L (bot) to L (bot)' (where L (top) and L (bot) are object distances at respective points in the field, and L (top)' and L (bot)' are image distances for the relevant field). However, the image plane and object plane will no longer be optically conjugate when a tilted objective is used. Other aberrations of the objective will therefore be very large and this method cannot be used when a large effective focal length is required, or high resolution is required.

Similar problems arise in relation to LCD projectors. However, the LCD array plane is preferably arranged to be tele-centric, i.e. not tilted relative to the objective, in order for the LCD array to have more energy output. However, the arrangement in FIG. 4 has been proposed, and interposes a Fresnel lens 120 between the LCD plane 122 and the objective 124, to produce a tilted intermediate virtual image of the LCD plane. The tilt introduced by the Fresnel lens 120 gives the virtual image a keystone shape but the intermediate virtual image can be conjugate with the plane of the screen 126, to reduce other aberrations, and the keystone effect introduced by the Fresnel lens is opposite to that introduced by a tilted screen, so that the overall degree of keystone effect can reduce.

The present invention seeks to provide improved projection arrangements, particularly, but not exclusively for use with LCD arrays.

The invention provides an objective arrangement for use in a projection system which provides an image plane tilted relative to the optical axis, the arrangement being rotationally asymmetric.

The projection system may have a field lens, preferably a Fresnel lens. Preferably the objective arrangement comprises a plurality of elements, preferably three elements, and preferably at least one element is off-set from the principal optical axis of the arrangement, to provide rotational asymmetry. Preferably the off-set element is the final element of the arrangement.

The arrangement may be a fixed focus or vari-focus arrangement, and is preferably a zoom arrangement. Preferably the or each fixed elements is off-set and the or each movable element is aligned with the principal optical axis.

The degree of asymmetry is preferably selected substantially to balance rotationally asymmetric aberrations caused by the tilt of the Fresnel lens. The degree of asymmetry may be selected substantially to reduce or correct astigmatism caused by the tilt of the Fresnel lens.

The objective arrangement may be constructed according to the measurements set out in Appendix B below.

The invention also provides a projection system comprising a planar image source, a Fresnel lens tilted relative to the image plane, and an objective arrangement substantially as set out above, the system being arranged to cause an image from the image source to be projected through the Fresnel lens and objective arrangement.

Figures 4, 5:
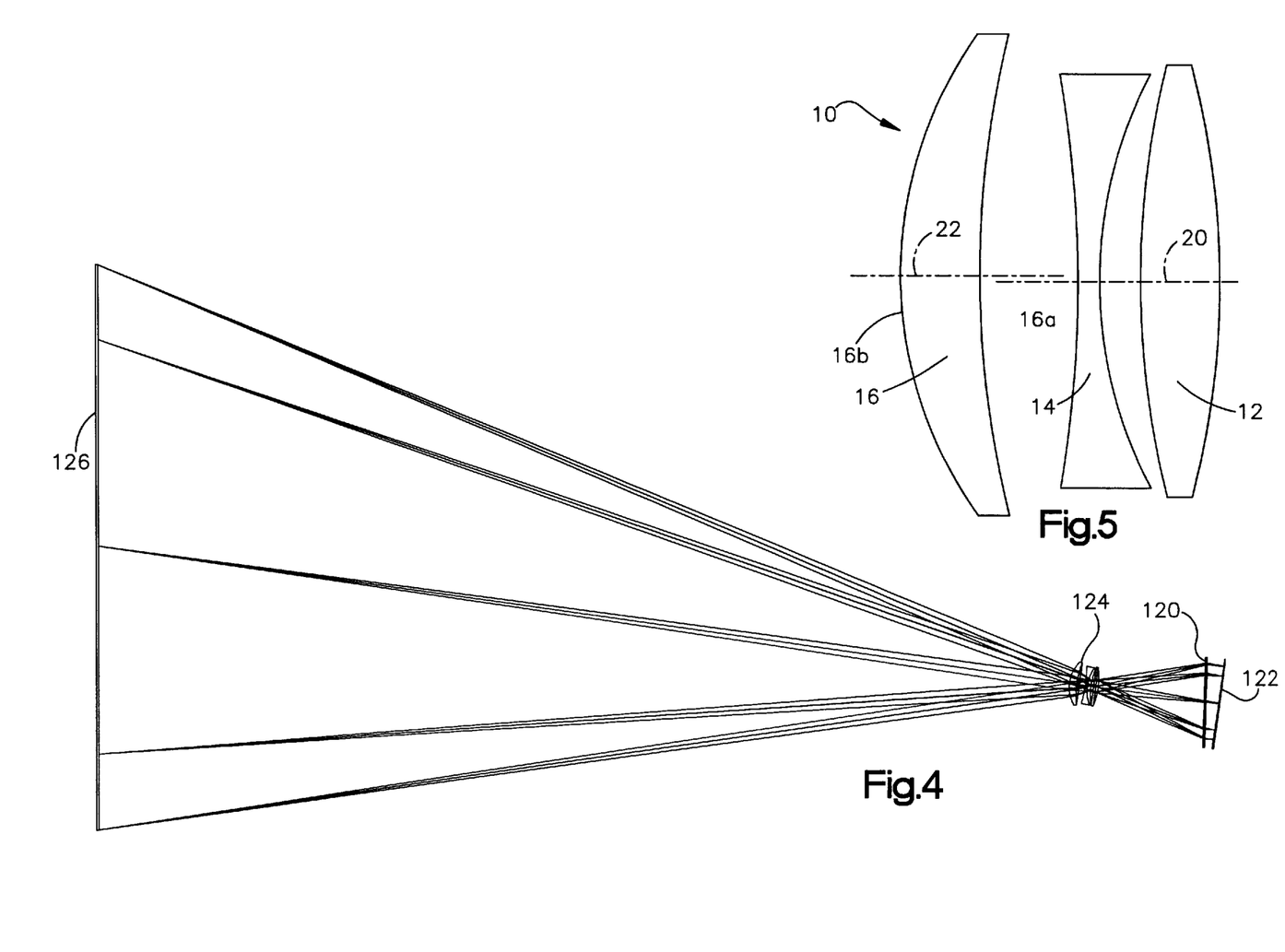
FIG. 4 shows an arrangement similar to that of FIG. 3, for use with an LCD projector.
FIG. 5 illustrates an objective arrangement according to the invention.

The present invention will now be described in more detail, by way of example only, and with reference to the accompanying drawings, in which:

FIG. 5 illustrates schematically, in conventional form, an objective arrangement 10 for use in a projection system which provides a tilted image plane. The arrangement 10 is rotationally asymmetric.

In more detail, the arrangement 10 consists of three elements 12,14,16. Light passes through the arrangement 10 from the right as shown in FIG. 5, toward the left, and on this account, the elements 12,14,16 will hereafter be called the first, second and third elements respectively.

The first element 12 is biconvex. The second element 14 is biconcave. The third element 16 is concave on its upstream face 16a and convex on its downstream face 16b.

The first and second elements have coincident principle optical axes 20, but the third element 16 has a principle optical axis 22 which is displaced to one side but parallel with the axes 20. The significance of this displacement will become apparent below.

After systematic study and analysis, the inventors have appreciated that although conventional objective arrangements having a single principal optical axis can produce some aberrations which contribute toward a reduction in the aberrations resulting from the tilted Fresnel lens, the magnitude of the aberrations produced by the objectives was much less than that of the aberrations produced by the Fresnel lens and consequently, even if used for correction, the residual rotationally asymmetric (non-linear) aberrations, especially astigmatism, are still unacceptably large. The inventors have therefore adopted the arrangement shown in FIG. 5, in which the off-set of the last element 16 introduces a rotational asymmetry into the objective system, which can be used to further correct the aberrations introduced by the Fresnel lens.

Using this arrangement in connection with an LCD projector has resulted in the keystone effect being reduced to a negligible level because the tilted Fresnel lens produces a keystone effect opposite to that caused by the tilted screen and in addition, the off-set of the third element 16 also produces a small keystone effect which can be used to finally balance the overall keystone effect. In addition, the off-set can be chosen to introduce an appropriate amount of rotationally asymmetric aberration to balance the residual rotationally asymmetric aberrations otherwise present in the system. The overall effect is to produce a projection system having a substantially improved performance in terms of keystone and rotationally asymmetric distortions and aberrations.

The design of an objective arrangement according to the present invention can be more fully understood by first describing in detail an objective arrangement in which there is no off-set in the third element, and then similarly describing the effect of introducing the off-set in accordance with the invention.

Example Without Off-Set

Appendix A provides additional lens description data for an objective arrangement generally as shown in FIG. 5, but conventional in having three elements with coincident principle optical axes.

Figure 6:
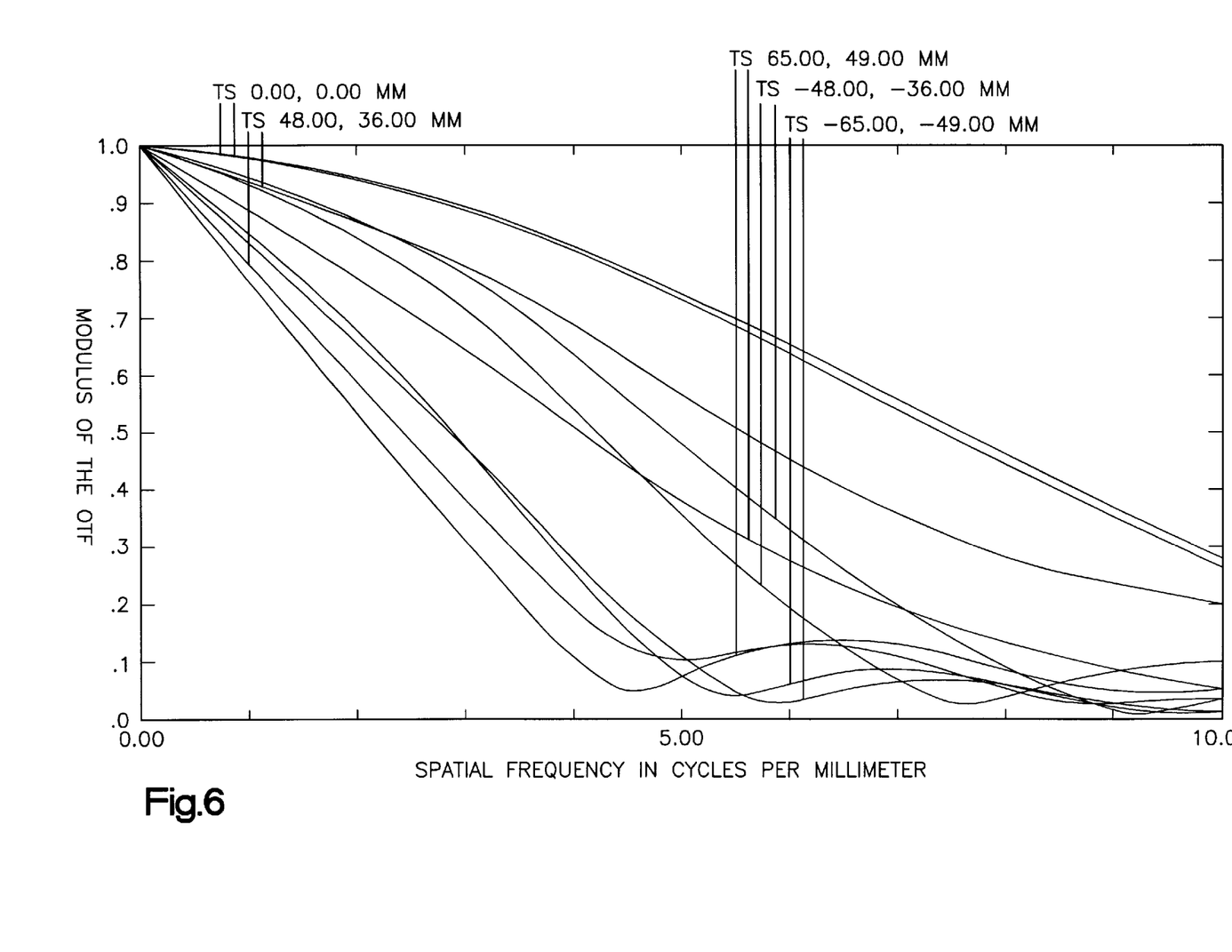
FIG. 6 illustrates the modulation transfer function of an arrangement not embodying the invention.

This objective arrangement has been used experimentally as the objective of an LCD projector arrangement of the type shown in FIG. 4, and yielded experimental results as shown in FIG. 6. FIG. 6 shows the polychromatic diffraction modulation transfer function for wavelengths from 0.486 t to 0.6563 microns.

Figures 7, 7I, 7V:
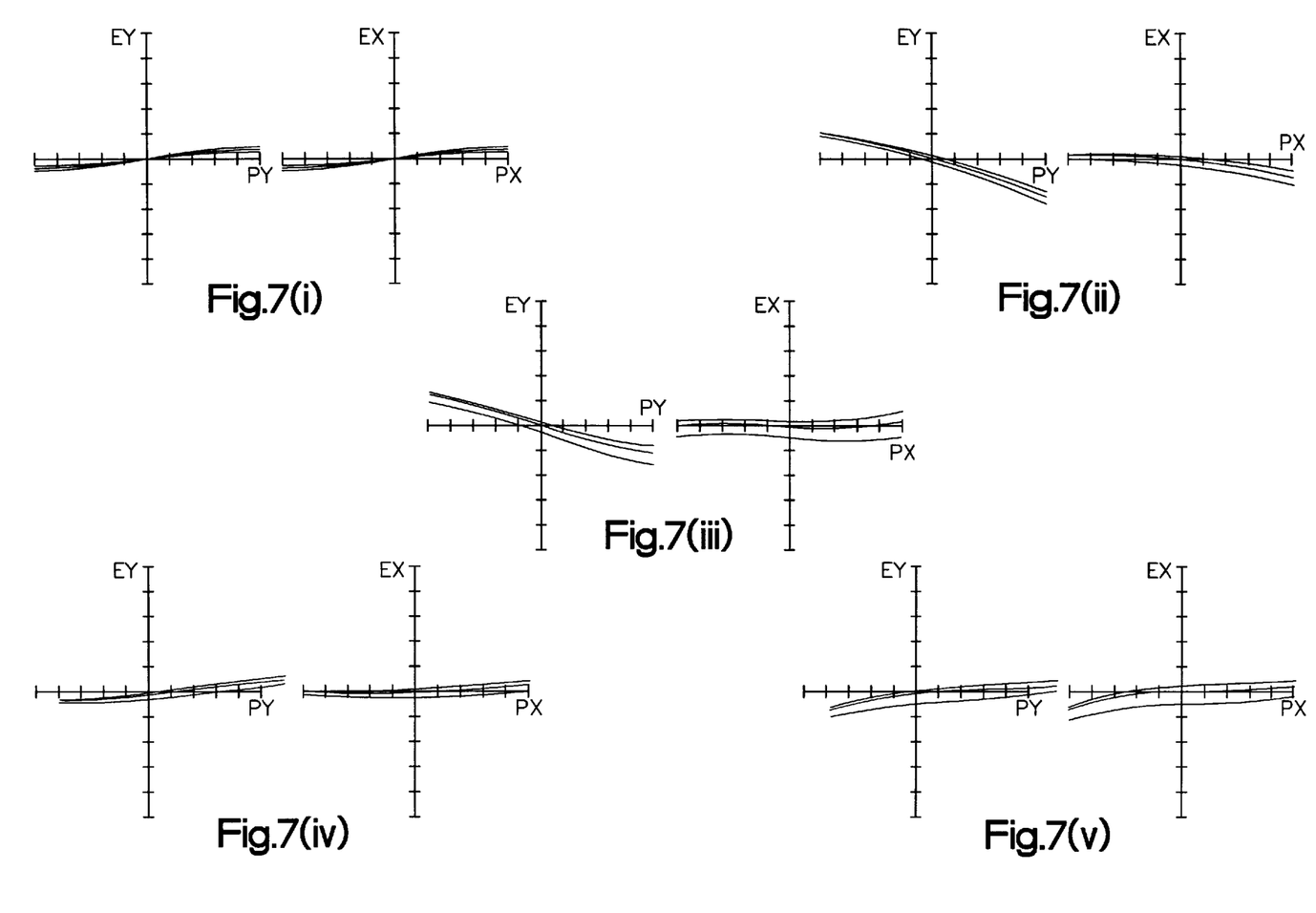
FIG. 7 shows transverse ray fan plots of the arrangement of FIG. 6.

FIG. 7 shows transverse ray fan plots for the same zoom position. Each plot includes data for three wavelengths, namely 0.486 microns, 0.588 microns and 0.656 microns. There are five pairs of plots, as follows:

Plot Identification

| | | |
|---|---|---|
| i | IMA: 0.00, 0.00 mm | |
| ii | IMA: 48.00, 36.00 mm | |
| iii | IMA: 65.00, 49.00 mm | |
| iv | IMA: −48.00, −36.00 mm | |
| v | IMA: −65.00, −49.00 mm | |

Figure 8A:
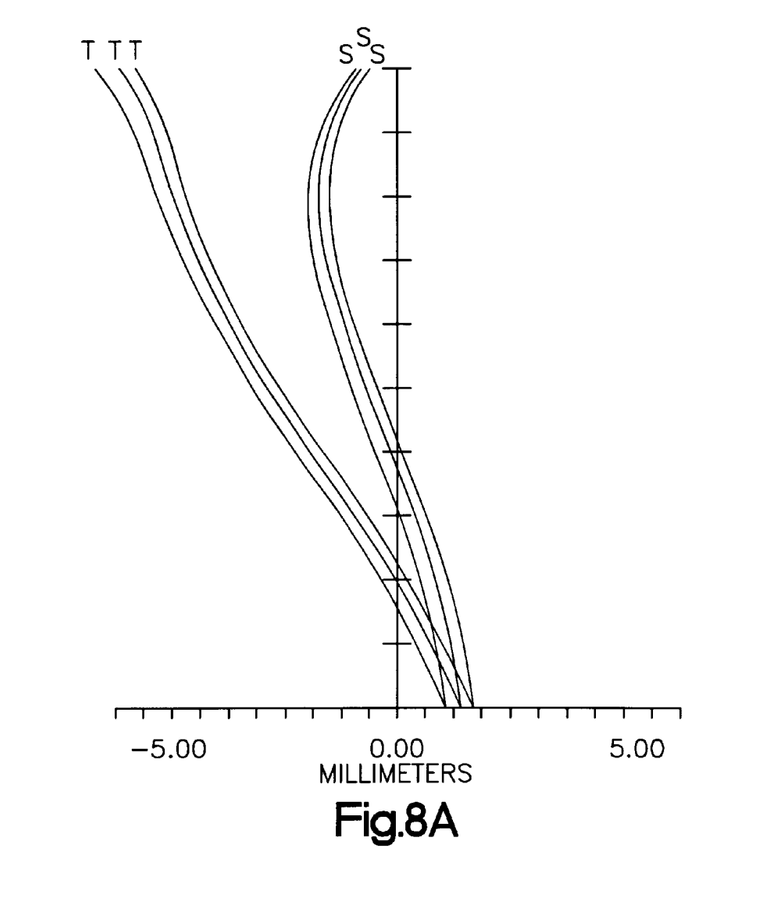
FIG. 8 shows field curvature and distortion plots of the arrangement of FIG. 6.
Figure 8B:
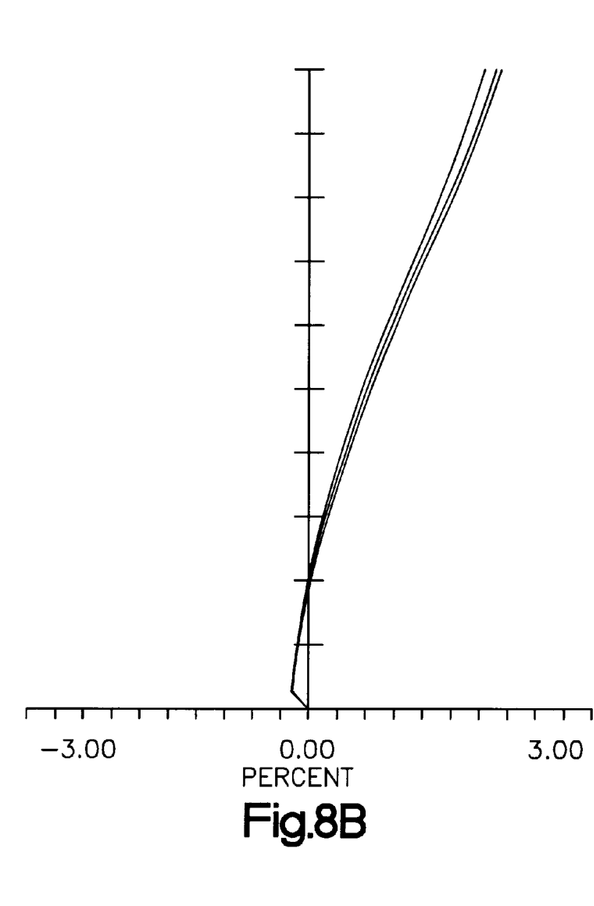
Figure 9:
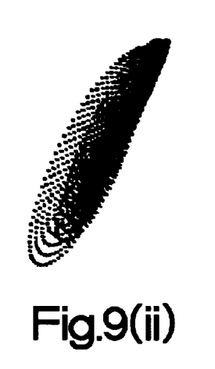
FIG. 9 shows spot diagrams of the arrangement of FIG. 6.
Figure 9I:
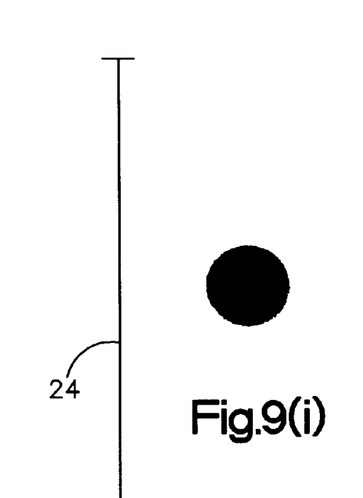
Figure 9V:
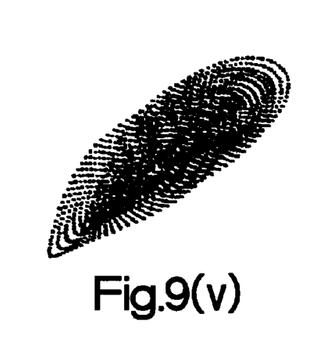

FIG. 8 shows field curvature and distortion plots for the same zoom positions, again showing lines for three wavelengths, namely 0.486 microns, 0.588 microns, 0.636 microns. In each case, the maximum field is 81.400 mm. Finally, FIG. 9 shows spot diagrams at the three zoom positions. In these drawings, the reference bar 24 represents 400 microns and other parameters for these images are as follows:

| FIG. No. | Parameters | RMS Radius | GEO Radius |
|---|---|---|---|
| 9 i | IMA: 0.000, 19.739 mm | 32.876 | 51.463 |
| 9 ii | IMA: 48.496, 56.243 mm | 76.727 | 210.327 |
| 9 iii | IMA: 66.026, 69.784 mm | 85.769 | 233.376 |
| 9 iv | IMA: −48.263, −16.311 mm | 55.541 | 123.705 |
| 9 v | IMA: −65.591, −29.503 mm | 87.616 | 220.385 |

Asymmetric Design

Figure 10:
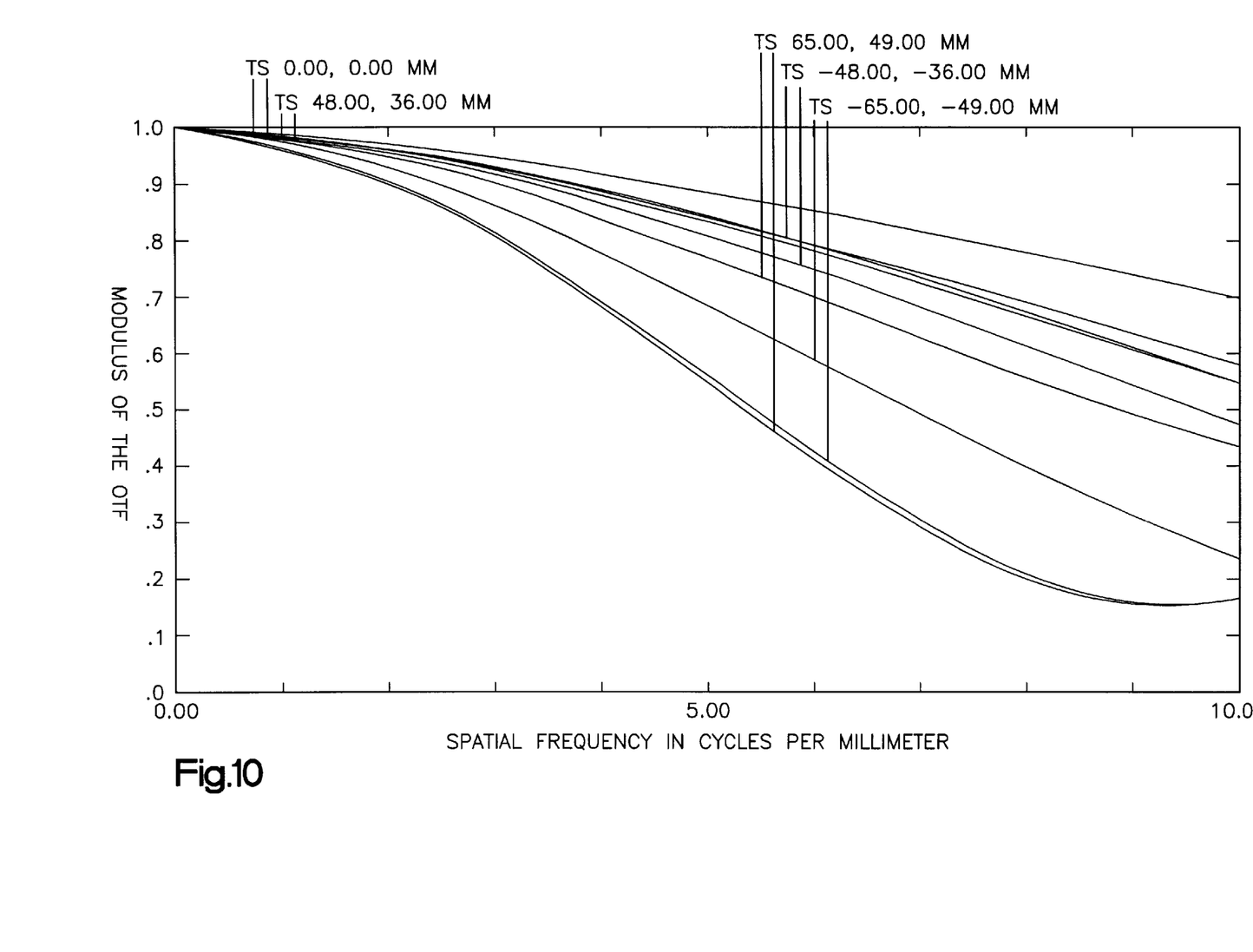
FIGS. 10 to 13 correspond to FIGS. 6 to 9 but relate to an arrangement according to the invention.

Appendix B and FIGS. 10 to 13 correspond to Appendix A and FIGS. 6 to 9, but relate to an asymmetric arrangement according to the invention and having an effective focal length of 170 mm. The element 16 (FIG. 5) has been off-set from the principal optical axis, in accordance with the invention, by an amount of about 0.75 mm. Appendix B shows the general lens data. FIG. 10 shows the optical transfer function for the same zoom position as illustrated in FIG. 6. It is apparent that there is a substantial improvement in the transfer function.

In use, it is the off-set element 16 which remains fixed against rotation during zooming or focus adjustment, while one or both aligned elements 12,14 are movable.

Figure 11:
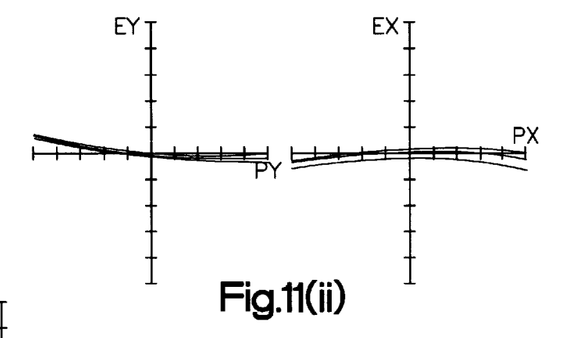
Figure 11I:
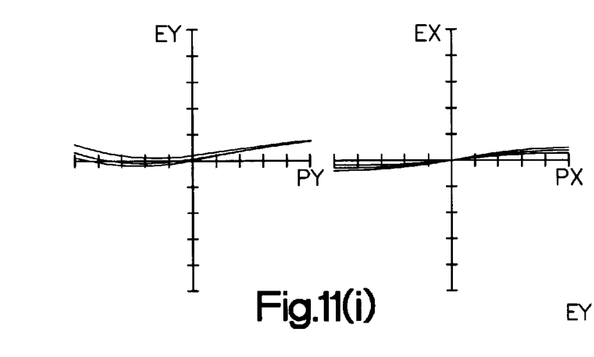
Figure 11V:
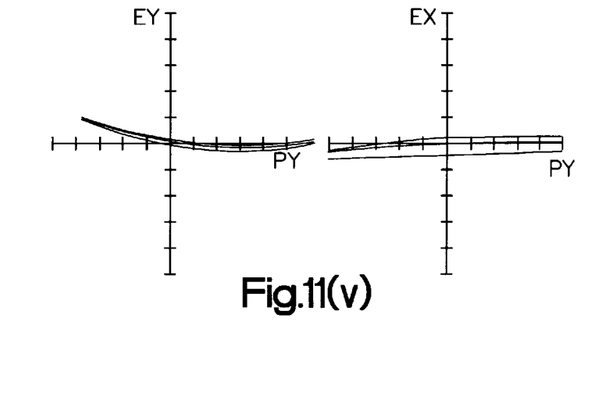

FIG. 11 shows transverse ray fan plots corresponding to those in FIG. 7 and again, it can readily be seen that there is an overall significant improvement in performance.

Figure 12A:
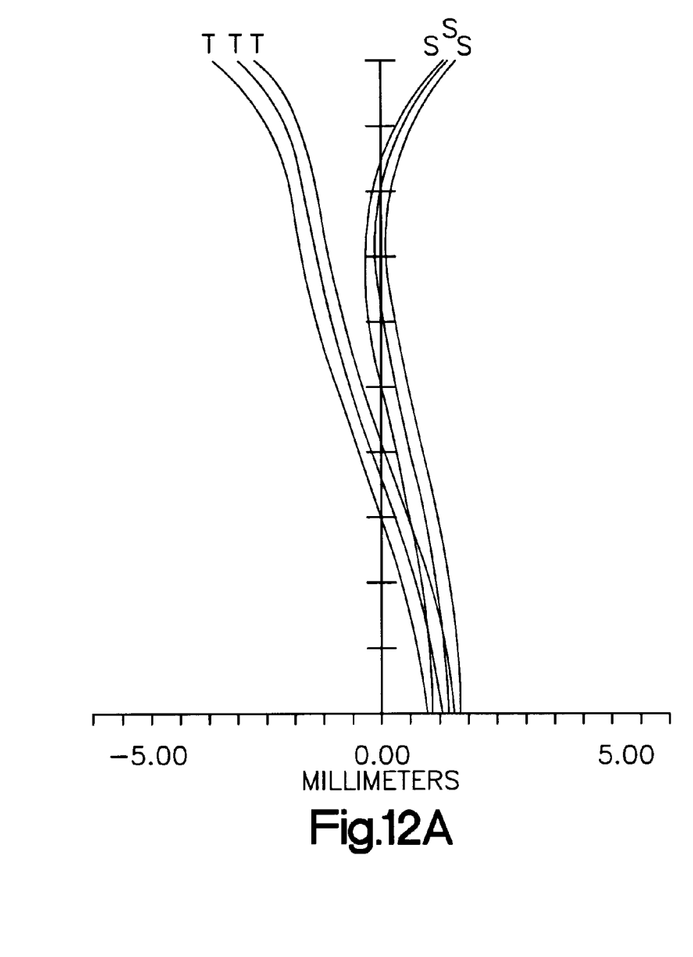
Figure 12B:
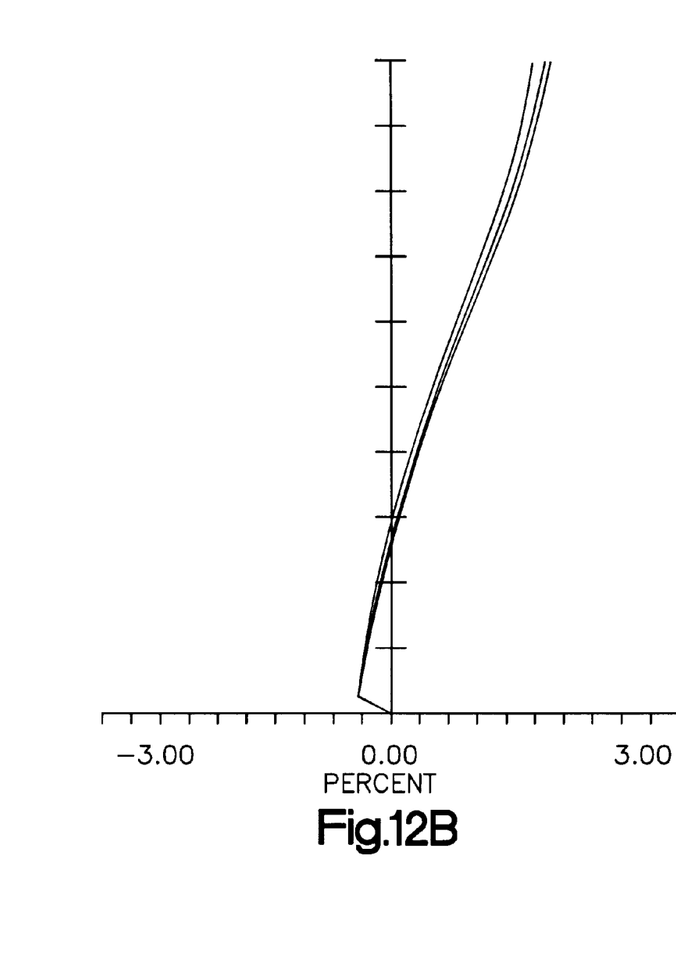
Figure 13:
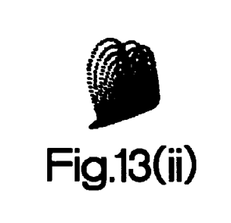
Figure 13I:
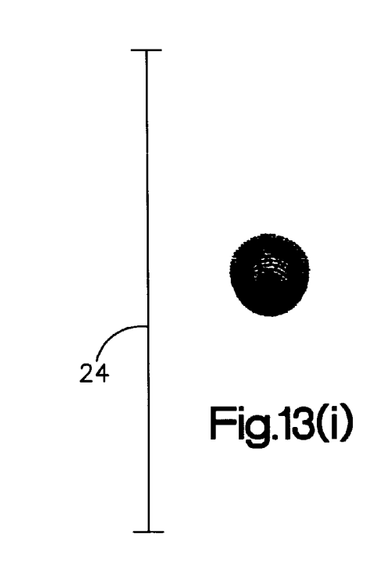
Figure 13V:
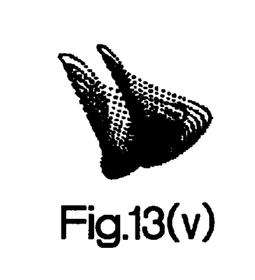

FIG. 12 shows the field curvature and distortion obtained from the objective arrangement according to the invention and, when contrasted with the corresponding plots in FIG. 8 shows again a marked improvement in performance. Finally, spot diagrams are shown in FIG. 13, to which the following experimental data applies:

| FIG. No. | Parameters | RMS Radius | GEO Radius |
|---|---|---|---|
| 13 i | IMA: 0.000, 20.819 mm | 36.798 | 74.383 |
| 13 ii | IMA: 48.399, 57.279 mm | 35.941 | 95.500 |
| 13 iii | IMA: 65.784, 70.737 mm | 54.153 | 136.790 |
| 13 iv | IMA: −48.166, −15.078 mm | 45.024 | 127.557 |
| 13 v | IMA: −65.392, −28.149 mm | 56.421 | 148.747 |

This example may have fixed focus or be modified for variable focus, e.g. by allowing the relative positions of the elements to be changed. However, the off-set element remains fixed against rotation, during focusing or zooming, so that the asymmetry is retained.

The examples above off-set the final element of the triplet. It can be shown that when an optical element is small relative to its optical field of view, then off-setting any one element is equivalent to off-setting any one other element.

It will be apparent from the above disclosure that many variations and modifications can be made without departing from the scope of the present invention. These modifications would include fixed focus, vari-focus and zoom systems. In particular, the details disclosed are by way of example only and it will be readily apparent to the skilled man how other dimensions can be chosen in order to implement the invention in other embodiments, and to adapt the invention according to the choice of optical material (glass, polymers or the like).

Whilst endeavoring in the foregoing specification to draw attention to those features of the invention believed to be of particular importance it should be understood that the Applicant claims protection in respect of any patentable feature or combination of features herein before referred to and/or shown in the drawings whether or not particular emphasis has been placed thereon.

APPENDIX A

| | | | | | | |
|---|---|---|---|---|---|---|
| Whole F/# | 5.6 | | | | | |
| Working F/# | 9.5 | | | | | |
| Image heights: | (−65, −49), (−48, −36), (0,0), (48, 36), (65, 49) | | | | | |
| Wavelengths: | 0.48613, 0.58756, 0.65627 | | | | | |

Surface data summary:

| Surf. | Radius | Thickness | Glass | Diameter | Decentr. | Tilt |
|---|---|---|---|---|---|---|
| Object | | 1800 | | | | 8° |
| 1 | 49.197 | 9.75 | SSKN5 | 58 | | |
| 2 | 132.808 | 11.86 | | 58 | | |
| 3 | −150.129 | 2.60 | F2 | 50 | | |
| 4 | 51.807 | 5.11 | | 50 | | |
| 5 | 108.841 | 9.75 | SK16 | 52 | | |
| 6 | −97.431 | 138.26 | | 52 | | |
| FRESNEL | aspheric | 2.00 | ACRYLIC | 164 | | 6.5° |
| 8 Image | | 16.00 | | 164 | | |

APPENDIX B

| | | | | | | |
|---|---|---|---|---|---|---|
| Whole F/# | 5.6 | | | | | |
| Working F/# | 9.5 | | | | | |
| Image heights: | (−65, −49), (−48, −36), (0,0), (48, 36), (65, 49) | | | | | |
| Wavelengths: | 0.48613, 0.58756, 0.65627 | | | | | |

| Surf. | Radius | Thickness | Glass | Diameter | Decentr. | Tilt |
|---|---|---|---|---|---|---|
| Object | | 1800 | | | | 8° |
| 1 | 47.788 | 9.75 | SSKN5 | 58 | 0.75 | |
| 2 | 117.960 | 11.86 | | 58 | 0.75 | |
| 3 | −160.560 | 2.60 | F2 | 50 | | |
| 4 | 50.795 | 5.11 | | 50 | | |
| 5 | 101.486 | 9.75 | SK16 | 52 | | |
| 6 | −101.486 | 138.27 | | 52 | | |
| FRESNEL | aspheric | 2.00 | ACRYLIC | 164 | | 6.5° |
| 8 Image | | 16.00 | | 164 | | |

What is claimed is:

1. An objective arrangement for use in a projection system, the arrangement including a plurality of lenses configured to an image planes said image plane tilted relative to an optical axis, the arrangement being rotationally asymmetric, with a first part of the arrangement being configured on a first axis and at least a part of the remainder of the arrangement configured on a second axis, said first axis and said second axis being parallel whereby the image plane is variably tilted as the arrangement is rotated.

2. An arrangement according to claim 1, wherein the projection system has a field lens.

3. An arrangement according to claim 2, wherein the field lens is a Fresnel lens.

4. An arrangement according to claim 1, wherein the objective arrangement comprises a plurality of elements.

5. An arrangement according to claim 4, wherein the objective arrangement comprises three elements.

6. An arrangement according to claim 4, wherein at least one element is off-set from the principal optical axis of the arrangement, to provide rotational asymmetry.

7. An arrangement according to claim 6, wherein the off-set element is the final element of the arrangement, said final element being disposed farthest from said image plane relative to the other elements.

8. An arrangement according to claim 1, wherein the arrangement is a fixed focus arrangement.

9. An arrangement according to claim 1, wherein the arrangement is a vari-focus arrangement.

10. An arrangement according to claim 1, wherein the arrangement is a zoom arrangement.

11. An arrangement according to claim 1, wherein the objective arrangement comprises at least one fixed element and at least one movable element, wherein each of the at least one fixed element is off-set from the principle optical axis and each of the at least one movable element is aligned with the principle optical axis.

12. An arrangement according to claim 1, wherein a degree of the rotational asymmetry is selectable.

13. An arrangement according to claim 12, wherein the projection system has a Fresnel lens and the degree of asymmetry is selectable substantially to balance rotationally asymmetric aberrations caused by a tilt of the Fresnel lens relative to the image plane.

14. An arrangement according to claim 13 or claim 12, wherein the degree of asymmetry is selectable substantially to reduce or correct astigmatism caused by the tilt of the Fresnel lens.

15. A projection system comprising a planar image source defining an image plane, a Fresnel lens titled relative to the image plane, and an objective arrangement, the arrangement being rotationally asymmetric with a first part of the arrangement being configured on a first axis and at least a part of the remainder of the arrangement configured on a second axis, said first and said second axis being parallel whereby the image plane is variably filted as the arrangement is rotated, the system being arranged to cause an image from the image source to be projected through the Fresnel lens and objective arrangement.

* * * * *